June 5, 1956  R. E. HAGER  2,748,869

SEALING AND PRESSURING APPARATUS

Filed July 23, 1953

RICHARD E. HAGER
INVENTOR

BY Browning, Simms & Hyer

ATTORNEYS

United States Patent Office 2,748,869
Patented June 5, 1956

2,748,869

SEALING AND PRESSURING APPARATUS

Richard E. Hager, Houston, Tex., assignor to Cameron Iron Works, Inc., Houston, Tex., a corporation of Texas Application July 23, 1953, Serial No. 369,913

13 Claims. (Cl. 166—75)

This invention relates to a sealing and pressuring apparatus particularly useful as a seal testing arrangement for pipe or casing in a wellhead construction wherein a seal is provided around the pipe or casing.

There are many situations in which it is desirable to have two bodies adjacent each other with no seal or tight frictional engagement between them at times and yet to be able to provide at will and quickly a seal between such bodies, and then to inject fluid under pressure between them with the seal thus formed holding the pressure thus injected. One of such situations is in the placing and testing of wellhead parts or bodies in the completion of wells such as high pressure oil and gas wells. This invention will be described in connection with its use in one such situation in testing the permanent seal between a casing hanger and a casing therein, for which use it is peculiarly adapted, but it will be understood that it is useful in other situations both on wellhead equipment and otherwise.

It is the usual practice in a wellhead construction to provide a permanent seal between the production string of casing or pipe and the casing head surrounding the string. Such a permanent seal may be formed between the casing and the casing hanger, or between the casing and a flange or other body surrounding the casing. This seals separates the pressures which are inside the production string from those pressures which are outside it and inside the surface casing. The seal may be formed by a weld or by packing rings engaging the pipe and the body or casing hanger. It is highly desirable that this seal be tested before completion of the well to determine whether there is any leakage.

In order to test the weld, or other permanent seal, it has been the practice to provide a test seal ring around the pipe below the permanent seal and to introduce a test fluid under pressure into the space surrounding the pipe between the permanent and the test seal ring.

On occasion in the past this seal ring has been a simple O-ring placed in an internal groove in the bore of the casing hanger so as to give initial sealing contact with the pipe at all times. The groove was shallow enough and the cross-section of the ring was of the proper size to insure this initial seal, as the ring was held in contact with the pipe. Such an arrangement and others providing an initial seal have not been entirely satisfactory due to the friction developed between the ring and the pipe which made it very difficult to slide the casing hanger along the pipe. The distance along the pipe that the hanger must slide is usually considerable since the hanger is usually dropped into place through the blowout preventer while the pipe is suspended from the derrick elevator. Thus, any friction present between the pipe and ring as it slides is undesirable as it hampers the free drop of the hanger.

The present invention is thus concerned with the provision of a seal ring which is initially out of contact with the pipe but which may be moved into sealing contact therewith. Thus, any sliding friction between the ring and pipe is substantially eliminated. The invention further contemplates that the seal ring be disposed substantially within a groove formed in the internal bore of the casing hanger. This disposition of the seal ring keeps it from interfering with placement of the hanger over the casing and also greatly lessens the likelihood that the seal ring will be damaged. The invention also provides that the same fluid under pressure that is subsequently used to test the permanent seal be used to effect the movement of the seal ring into sealing engagement with the pipe.

It is therefore an object of this invention to provide a sealing and pressuring apparatus in which there will be no initial frictional engagement between two bodies to be sealed to each other, but in which, upon application of fluid under pressure, a seal will be first effected between the parts and then fluid under pressure injected between the parts.

It is also an object of this invention to provide in a wellhead construction an arrangement for testing a permanent seal wherein the same fluid under pressure may be used both to effect sealing contact of a test seal around the pipe and to test the permanent seal.

Another object is to provide a casing hanger, having pressure responsive means for providing a test seal between the hanger and the casing or pipe received by the hanger, wherein the same fluid under pressure may be utilized both to actuate said means and to test the weld or other permanent seal formed between the hanger and the pipe.

Another object is to provide a casing hanger having pressure responsive seal forming means therein, which hanger slides easily over its casing prior to application of fluid pressure.

Another object is to provide a seal testing arrangement including a casing hanger having a sealing ring in a groove therein, the sealing ring arranged to be initially out of engagement with the pipe with which it is to be used and being movable by pressure into sealing engagement with the pipe.

These and other objects will become apparent upon perusal of the following specification, claims and drawings.

Figure 1:
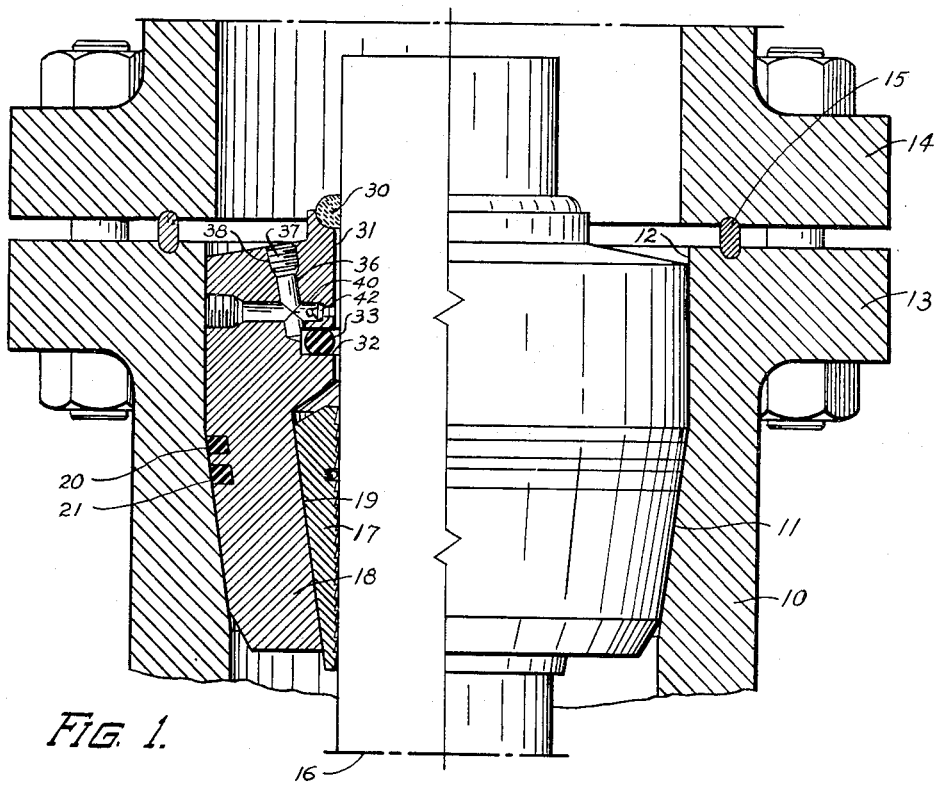
Fig. 1 is a vertical fragmentary view partly in section showing a wellhead construction having a pipe suspended therein and the sealing and pressuring arrangement of this invention as used for testing a permanent seal.
Figure 2:
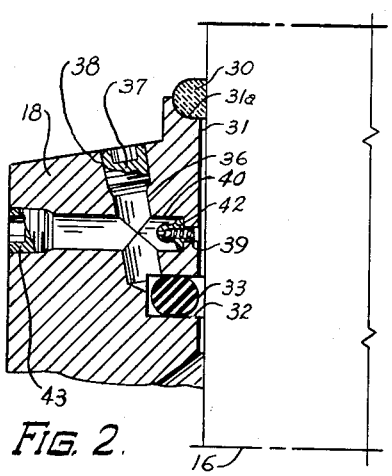
Fig. 2 is an enlarged view of a portion of the casing hanger and casing of Fig. 1 with the test seal ring not in operative engagement with the pipe.

Referring now in detail to the drawings, the numeral 10 designates a casing head which may be supported conventionally on the surface casing (not shown) and provided centrally with an inclined bowl portion 11 below a cylindrical portion 12. The upper end of the casing head 10 is formed with a lateral flange 13 provided with a plurality of openings through which it may be bolted to the flange 14 of an upper well equipment member such as another casing head, tubing head, blowout preventer, valve or the like. The facing sides of flanges 13 and 14 have registering grooves to receive the metal seal ring 15 which forms a fluid-tight seal between them.

A string of well casing 16 or similar pipe is suspended from casing head 10 by wedge-shaped slips 17 whose inner faces are toothed to engage and support the casing 16 and whose outer tapering faces engage the tapered bowl portion 19 of a casing hanger or support body 18. The outer tapering faces of the casing hanger 18 seat on the bowl portion 11 of the casing head. Hydraulic packing rings 20 and 21 are provided in annular grooves formed in the casing hanger and serve to seal the space between the casing head 10 and the casing hanger 18.

The casing hanger or body 18 has an internal bore 31 larger than the O. D. of the pipe 16 by an amount which will accommodate tolerances in pipe manufacture and give sufficient clearance to insure that the hanger slides easily along the pipe. A portion 31a of the hanger 18 is adapted to receive a permanent seal between the hanger and the pipe. After the casing or pipe 16 has been landed in the well on the hanger structure just described and cut off at the top, a means forming a permanent seal, such as a weld 30, is provided between the portion 31a of the casing hanger 18 and the pipe 16. While this permanent seal is shown as a weld in this, the preferred embodiment, it will be understood by those skilled in the art that other types of permanent seals may be formed, one such other type being shown, e. g., in United States Patent 2,531,596. This permanent seal or weld may be initially imperfect or may crack and leak and it is highly desirable that it be tested prior to the completion of the well. It may also be desirable to test the permanent seal at some later time during the life of the well.

The casing hanger or body 18 includes means responsive to fluid pressure for providing a test seal between the body 18 and the pipe 16 at a position spaced from the permanent seal or weld 30 preferably below the permanent seal. This means may include an annular groove 32 formed intermediate the ends of the internal bore 31 of the body 18 and a movable sealing ring 33, preferably of resilient material, fitted within the groove. This groove 32 is narrower than the sealing ring so that sealing contact of the ring on either side of the groove is assured, and the depth of the groove is at least as great as the thickness of the ring and preferably slightly greater so as to provide a space in the groove behind the ring. The inside diameter of the ring 33 is substantially as great as or greater than the diameter of the bore 31 so that when the ring is installed in the groove, it is preferably within the regular contour of the wall of the bore 31, thus keeping the ring out of frictional contact with the pipe until the time of applying the test pressure and thus preventing any friction between the ring and pipe when the casing hanger is slid along the pipe, as it is dropped into place through a blowout preventer.

A passage 36 is provided in the body or hanger 18 in communication with the pressure responsive means. This passage 36 connects with the groove 32 at a position such that pressure may be built up in the groove radially outwardly of or behind the ring 33, the surface of the ring facing the bottom of the groove thus constituting a part subject to fluid pressure to force the sealing ring to project from the groove into sealing position. This passage 36 is adapted to receive fluid under pressure, and is closed by a removable threaded plug 37 engaging a threaded opening 38.

The body 18 also includes means operative upon injection of testing fluid into the passage 36 to establish a sufficient differential in pressure between the passage and the space between the bore 31 and the pipe to cause the sealing ring 33 to move into sealing contact with the pipe, said means also being operative to conduct flow of such testing fluid from the passage into said space at a position between the test seal and the permanent seal to be tested. This means in its preferred form includes a duct 39, communicating with the bore 31, an increased diameter portion 40 of the duct intersecting the passage 36, and a flow restriction in the form of a relief valve 42 in the duct. This relief valve 42 and the duct 39 operate to establish the differential in pressure when test fluid is injected in the passage as set forth above. The relief valve consisting of a ball valve member acted upon by pressure in passage 36 in a direction to lift it from its seat and a spring urging it to seated position, is set so that before it will open an amount of pressure is allowed to build up in the passage sufficient to force the sealing ring 33 into sealing engagement with the pipe. Above this pressure the relief valve 42 opens and the test fluid passes through the duct 39 and the relief valve, and into the annular space along the pipe 16 and between the ring 33 and the weld 30. A threaded plug 43 seals the portion 40 of the duct from the exterior of the hanger 18 and permits insertion and removal of the relief valve 42.

Figure 4:
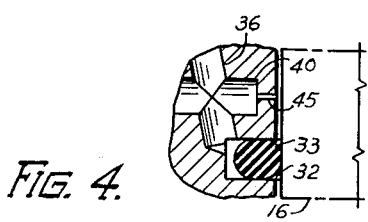
Fig. 4 is a fragmentary view showing an alternative embodiment of this invention including an orifice instead of the relief valve, shown in Fig. 3, to control the flow of testing fluid.

While the relief valve 42 and the duct 39 connected and operative as described are the preferred form of the means set out in the preceding paragraph, this invention is not to be construed as limited to this form since other restrictive means for establishing a differential in pressure and for conducting flow of the test fluid into the space between the pipe and the bore may be used within the scope of this invention. One such other means may be an orifice 45 provided between the passage 36 and the bore 31 as shown in Fig. 4. Such an orifice will work satisfactorily if its size is selected and if the test fluid is admitted into the passage fast enough and in sufficient quantity so that the desired pressure differential is established. The relief valve is preferred over the orifice because the relief valve admits test pressure into the annular space around the pipe 16 only after the sealing ring has been moved into sealing contact with the pipe. Thus, the relief valve does not permit leakage of test fluid at the same time the sealing ring is being moved. The orifice, on the other hand, does permit such leakage of test fluid.

Figure 3:
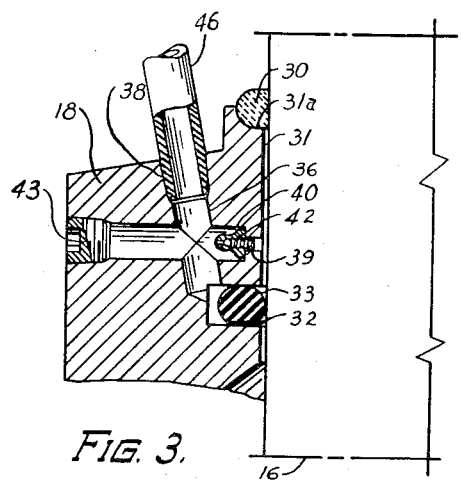
Fig. 3 is the same view as Fig. 2 except showing a conduit connected for supplying testing fluid and with the test seal ring shown in operative sealing engagement with the pipe.

The operation of the seal testing arrangement of this invention is believed apparent from the above disclosure. The casing hanger or body 18 is slid along the casing or pipe 16 without any contact between the sealing ring 33 and the pipe. Thereafter the permanent seal or weld 30 is applied. In order to test the permanent seal, fluid under pressure is admitted to the passage 36 as through the conduit 46 shown in Fig. 3. This fluid will cause the ring 33 to move into contact with the pipe 16 to form a test seal. The relief valve 42 may be set to open when the pressure within the passage 36 and the groove 32 builds up a predetermined amount, and will thus admit the same fluid under pressure to the annular space around the pipe 16 between the permanent seal and the test seal. One way of observing the results of the test may be by noting whether there is a drop in pressure after the pressure has built up to a predetermined test pressure which is always much higher than that required to open the relief valve. If there is no such drop in pressure, then it may be assumed that the permanent seal or weld 30 does not leak. Another way of testing the permanent seal may be to use a liquid, such as oil or soapy water, as the testing fluid and to observe any leakage of the liquid through the permanent seal. Where soapy water is used, appearance of bubbles outside the permanent seal will denote leakage of the seal.

It will be noted that any desired testing method may be utilized in connection with the arrangement of this invention, and no attempt has been made to portray or describe any particular method of exerting pressure for testing purposes.

It is also to be understood that the groove containing the seal ring may be faced in any direction in which the ring should move to form the seal and is not limited to the radially inward direction illustrated and that the sealing and pressuring may be utilized for other purposes than that of testing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a fluid actuated sealing arrangement, a body having a groove, a packing in the groove and in initial sealing engagement with the opposite sides of the groove, the groove being deep enough to provide space behind said packing, said body also having a branched passageway therein, one branch of said passageway conducting pressure to said space behind the packing to urge it outwardly of said groove and another branch conducting pressure to a point on the outer surface of the body outside said groove, and a restriction in the last named branch.

2. A seal testing arrangement for pipe in a well-head construction including a body having an internal bore to receive the pipe and having a portion adapted to receive a permanent seal between said body and a pipe in the bore; an annular groove formed in the wall of the bore; a movable resilient sealing ring positioned in the groove, the ring having a width greater than the width of the groove and the depth of the groove being at least as great as the largest radial dimension of the ring; a passageway in the body adapted to receive fluid under pressure and communicating with the groove at a position such that fluid pressure may be built up in the groove behind the ring; a duct connecting the passageway with the space between the pipe and the bore at a position between the permanent seal and the groove; and a relief valve in the duct set to open into said space upon a predetermined build up of pressure in said passageway; whereby, when a permanent seal is formed between the pipe and said portion, fluid under pressure admitted to said passageway may be used first to move the sealing ring into sealing position around the pipe and thereafter to test the permanent seal.

3. In combination with a body having a bore therethrough for receiving a pipe and for axial movement relative thereto, wherein said body has a portion for permanently sealing with said pipe, means for testing the permanent seal, which means comprises an annular groove in the bore wall, a first passageway within the body connecting with said groove, a second passageway within the body connecting with the bore of the body intermediate the groove and the portion for permanently sealing with the pipe, said first and second passageways connecting with the exterior of the body through a common passageway, and an annular sealing element received within and sealably engageable with opposite sides of the groove entirely therearound, said sealing element being movable under pressure from a position out of peripheral contact with said pipe to a position sealably engageable thereabout, and said second passageway being restricted such that fluid under pressure introduced into said common passageway will move said sealing element to its pipe sealing position prior to effecting a test pressure between the permanent seal and movable sealing element.

4. Testing means of the character defined in claim 3, wherein the second passageway is restricted by a valve member positioned to be urged off its seat by pressure in said second passageway and means of predetermined strength holding the valve member seated until overcome by a predetermined pressure in said second passageway.

5. Testing means of the character defined in claim 3, wherein the second passageway is restricted by a spring-closed pressure-opened valve positioned to be urged toward open position by pressure in said second passageway.

6. Testing means of the character defined in claim 3, wherein the second passageway is restricted by an orifice interposed between the connections of said second passageway with the common passageway and the bore of the body.

7. Testing means of the character defined in claim 3, wherein the second passageway is restricted by a duct therein and a relief valve in the duct.

8. In a fluid actuated sealing arrangement, a body having a groove, a packing in the groove and in initial sealing engagement with the opposite sides of the groove, a branched passageway in said body having an inlet and two outlets, one branch of said passageway conducting pressure through one of said outlets to said groove behind the packing to urge it outwardly of said groove and another branch conducting pressure through the other of said outlets to a point on the outer surface of the body outside said groove, and a restriction in the last named branch.

9. For use in a well-head construction wherein a permanent seal is to be accomplished between two adjacent bodies, one of said bodies having a part adapted to receive a permanent seal and having also a passageway therein, a sealing means positioned in said one body and exposed to said passageway and responsive to fluid pressure in the passageway for movement between a position out of peripheral contact with said other body to a position in sealing contact with both of said bodies to provide a test seal between said adjacent bodies; said passageway also having an outlet from said one body between said sealing means and the permanent seal receiving part and means controlling said outlet operative upon injection of testing fluid into said passageway to establish sufficient differential in pressure between said passageway and the space between said test seal and the permanent seal to move the sealing means into sealing contact with said other body, said latter means also being operative to conduct flow of such testing fluid from said passageway into said space; whereby, when a permanent seal is formed between the two adjacent bodies, fluid under pressure admitted to said passageway may be used first to actuate said sealing means to provide a test seal and then to test the permanent seal.

10. In a well-head construction wherein a seal between adjacent bodies is to be pressure tested, one of said bodies having an internal bore for receiving the other body and adapted to define a space therebetween, sealing means in the bore of said first body, said sealing means in the body initially of inside diameter greater than the outside diameter of said other body with which it is to be used, the sealing means being movable by pressure into sealing engagement with both of said bodies, said one body having therein a passageway adapted to receive fluid under pressure and in communication with said sealing means and also with the bore wall of said one body within the space to one side of said sealing means, and additional means controlling said last mentioned communication operative upon injection of testing fluid into said passageway to establish a sufficient differential in pressure between the passageway and the space between the bore wall and said other body to move the sealing means into sealing engagement with said other body, said additional means also being operative to conduct flow of such testing fluid from said passageway into said space at a position adjacent said sealing means.

11. In a well-head construction including a body having an internal bore for receiving pipe in spaced relation thereto and having a portion adapted to receive a permanent seal between said body and a pipe in the bore, sealing means in the body initially of inside diameter greater than the outside diameter of the pipe with which it is to be used, said sealing means being movable by pressure into sealing engagement with the pipe, a passageway in the body adapted to receive fluid under pressure and communicating with said sealing means, said passageway also having an outlet in the bore wall between said sealing means and said portion for receiving a permanent seal, and means controlling flow from said passageway through said outlet and operative upon injection of testing fluid into said passageway to control flow of fluid pressure into said space between the bore wall and the pipe to permit the sealing pressure to move the sealing means into sealing contact with the pipe prior to building up pressure in said space at a position between the sealing means and said portion adapted to receive a permanent seal, whereby the seal may be tested.

12. In a well-head construction including a body having an internal bore for receiving pipe in spaced relation thereto, and having a portion adapted to receive a permanent seal between said body and a pipe in the bore, an annular groove formed in the bore wall, and a sealing ring disposed substantially within the groove and in sealing engagement therewith, the improvement comprising: a passageway in the body adapted to receive testing fluid under pressure and communicating with the groove at a position such that pressure may be built up in the groove behind the ring, said passageway also having an outlet in the bore wall between said sealing means and said portion for receiving a permanent seal, and means controlling flow from said passageway through said outlet and operative upon injection of testing fluid into said passageway to control flow of fluid pressure into said space between the bore wall and the pipe to permit the sealing pressure to move the sealing means into sealing contact with the pipe prior to building up pressure in said space at a position between the sealing ring and said portion adapted to receive a permanent seal which may be formed around the pipe, whereby the permanent seal may be tested.

13. For use in a well-head construction, a body having an internal bore for receiving a pipe in spaced relation thereto and a portion adapted to receive a permanent seal between the body and the pipe; an annular groove formed in the wall of the bore; a movable sealing ring in sealing engagement with the walls of the groove, the inner diameter of the sealing ring being greater than the outer diameter of the pipe with which the body is to be used; a passageway in the body adapted to receive pressure and communicating with the groove at a position such that pressure may be built up in the groove behind the ring; said passageway also having an outlet in the bore wall between said sealing means and said portion for receiving a permanent seal, and means controlling flow from said passageway through said outlet and operative upon injection of testing fluid into said passageway to control flow of fluid pressure into said space between the bore wall and the pipe to permit the sealing pressure to move the sealing means into sealing contact with the pipe prior to building up pressure in said space at a position between the sealing ring and said portion adapted to receive a permanent seal which may be formed around the pipe, whereby the same fluid under pressure admitted to said passageway may be used first to move the sealing ring into sealing position around the pipe and thereafter to test the permanent seal.

References Cited in the file of this patent
UNITED STATES PATENTS

| 2,207,469 | Roye | July 9, 1940 |
| 2,350,867 | Bean et al. | June 6, 1944 |
| 2,443,944 | Bean | June 22, 1948 |
| 2,485,497 | Lemley et al. | Oct. 18, 1949 |
| 2,624,413 | Mueller et al. | Jan. 6, 1953 |